US008937855B2

(12) United States Patent
Yamazaki et al.

(10) Patent No.: US 8,937,855 B2
(45) Date of Patent: Jan. 20, 2015

(54) HOLOGRAPHIC OPTICAL PICKUP DEVICE, OPTICAL INFORMATION RECORDING AND REPRODUCING DEVICE, AND METHOD OF REPRODUCING OPTICAL INFORMATION, HAVING ANGULAR VARIABLE ELEMENT ARRANGEMENTS FOR CHANGING A LIGHT ANGLE

(71) Applicant: Hitachi Media Electronics Co., Ltd., Oshu-shi, Iwate (JP)

(72) Inventors: Kazuyoshi Yamazaki, Yamato (JP); Ken-ichi Shimada, Tuson, AZ (US)

(73) Assignee: Hitachi Media Electronics Co., Ltd., Yokohama-Shi (JP)

( * ) Notice: Subject to any disclaimer, the term of this patent is extended or adjusted under 35 U.S.C. 154(b) by 0 days.

(21) Appl. No.: 13/921,404

(22) Filed: Jun. 19, 2013

(65) Prior Publication Data
US 2013/0336099 A1 Dec. 19, 2013

(30) Foreign Application Priority Data

Jun. 19, 2012 (JP) .................................. 2012-137608

(51) Int. Cl.
*G11B 7/00* (2006.01)
(52) U.S. Cl.
USPC ....................................... 369/103; 369/112.29
(58) Field of Classification Search
None
See application file for complete search history.

(56) References Cited

U.S. PATENT DOCUMENTS

| 2007/0236765 | A1 | 10/2007 | Jung |
| 2008/0165654 | A1 | 7/2008 | Fukuhara |
| 2009/0207710 | A1 | 8/2009 | Ayres et al. |
| 2009/0279153 | A1* | 11/2009 | Iwamura et al. ................ 359/22 |
| 2011/0261671 | A1* | 10/2011 | Ishii et al. ................ 369/109.01 |
| 2011/0280112 | A1* | 11/2011 | Nakamura et al. ......... 369/47.49 |
| 2012/0008476 | A1* | 1/2012 | Kuroda et al. ............. 369/47.49 |
| 2012/0188618 | A1* | 7/2012 | Ishii et al. ......................... 359/3 |

FOREIGN PATENT DOCUMENTS

| JP | 2007-280592 | 10/2007 |
| JP | 2008-170606 | 7/2008 |

OTHER PUBLICATIONS

JP Office Action for Japanese Application No. 2012-137608, issued on Jun. 24, 2014.

* cited by examiner

*Primary Examiner* — Paul Huber
(74) *Attorney, Agent, or Firm* — Antonelli, Terry, Stout & Kraus, LLP.

(57) ABSTRACT

A holographic optical pickup device includes an optical axis split element for splitting a reference beam into two light beams in different propagation directions having polarized states substantially orthogonal to each other, angular variable elements for changing incident angle of the reference beam for irradiating an optical information recording medium, an image sensor for detecting a diffracted beam generated from a recorded region upon irradiation of the optical information recording medium with the reference beam to form a reproduction signal, and photodetectors for detecting the diffracted beam generated from the recorded region upon irradiation of the optical information recording medium with the reference beam. An angular error signal is generated for controlling the angular variable element using signals detected by the photodetectors.

20 Claims, 8 Drawing Sheets

HOLOGRAPHIC OPTICAL PICKUP DEVICE, OPTICAL INFORMATION RECORDING AND REPRODUCING DEVICE, AND METHOD OF REPRODUCING OPTICAL INFORMATION, HAVING ANGULAR VARIABLE ELEMENT ARRANGEMENTS FOR CHANGING A LIGHT ANGLE

CLAIM OF PRIORITY

The present application claims priority from Japanese patent application serial No. JP 2012-137608, filed on Jun. 19, 2012, the content of which is hereby incorporated by reference into this application.

BACKGROUND OF THE INVENTION (1) Field of the Invention

The present invention relates to a holographic optical pickup device, an optical information recording and reproducing apparatus, and a method of recording and reproducing optical information for reproducing information on an optical information recording medium using holography.

(2) Description of the Related Art

Recently, a double luminous flux angular multiplexing method has been proposed as the holography that allows high-speed recording/reproduction of large capacity of data. This approach requires control of the relative angle between the signal beam and the reference beam with high accuracy. Aiming at satisfying the requirement, the technique as disclosed in US 2009/0207710 detects the signal beam using the image sensor for searching the relative angle between the signal beam and the reference beam, calculates the SNR for each recorded angle, and predicts the subsequent relative angle based on the calculated value so as to control the relative angle of the reference beam with respect to the signal beam.

SUMMARY OF THE INVENTION

The aforementioned technique disclosed in US 2009/0207710 is capable of searching the relative angle between the signal beam and the reference beam, but has two disadvantages to be overcome. The first disadvantage is difficulty in high-speed reproduction on the ground that the control signal for the relative angle (hereinafter referred to as the angular error signal) is generated after detecting the reproduction signal by the image sensor and calculating the SNR. The second disadvantage is incapability of providing the best reproduction signal on the ground that the angle is set to the value that shifts from the relative angle which ensures provision of the best reproduction signal by a small amount for generating the angular error signal of the reference beam.

The present invention provides a holographic optical pickup device, an optical information recording and reproduction device, and a method of recording and reproducing optical information, which allow high-speed reproduction and detection of the angular error signal for providing the best reproduction signal using the double luminous flux angular multiplexing method.

The present invention provides a holographic optical pickup device for recording an information signal by irradiating an optical information recording medium with a reference beam and a signal beam to form a hologram, or reproducing the information signal by irradiating the hologram on the optical information recording medium with the reference beam. The device includes a light source for emitting a light beam, a split element for splitting the light beam emitted from the light source into the signal beam and the reference beam, an optical axis split element for splitting the reference beam into two light beams in different propagation directions having polarized states substantially orthogonal to each other, an angular variable element for changing an incident angle of the reference beam split into the two light beams which irradiates the optical information recording medium, a spatial light modulator for adding the information signal to the signal beam, an objective lens for irradiating the optical information recording medium with the signal beam to which the information signal is added, an image sensor for detecting a diffracted beam generated from a recorded region when irradiating the optical information recording medium with the reference beam split into the two light beams, and a photodetector for detecting the diffracted beam generated from the recorded region when irradiating the optical information recording medium with the reference beam split into the two light beams. An angular error signal is generated for controlling the angular variable element using the signal detected by the photodetector.

The present invention provides the holographic optical pickup device, the optical information recording and reproducing device, and the method of recording and reproducing optical information, which allows high-speed reproduction and detection of the angular error signal for providing the best reproduction signal.

DETAILED DESCRIPTION OF THE EMBODIMENT

Figure 1:
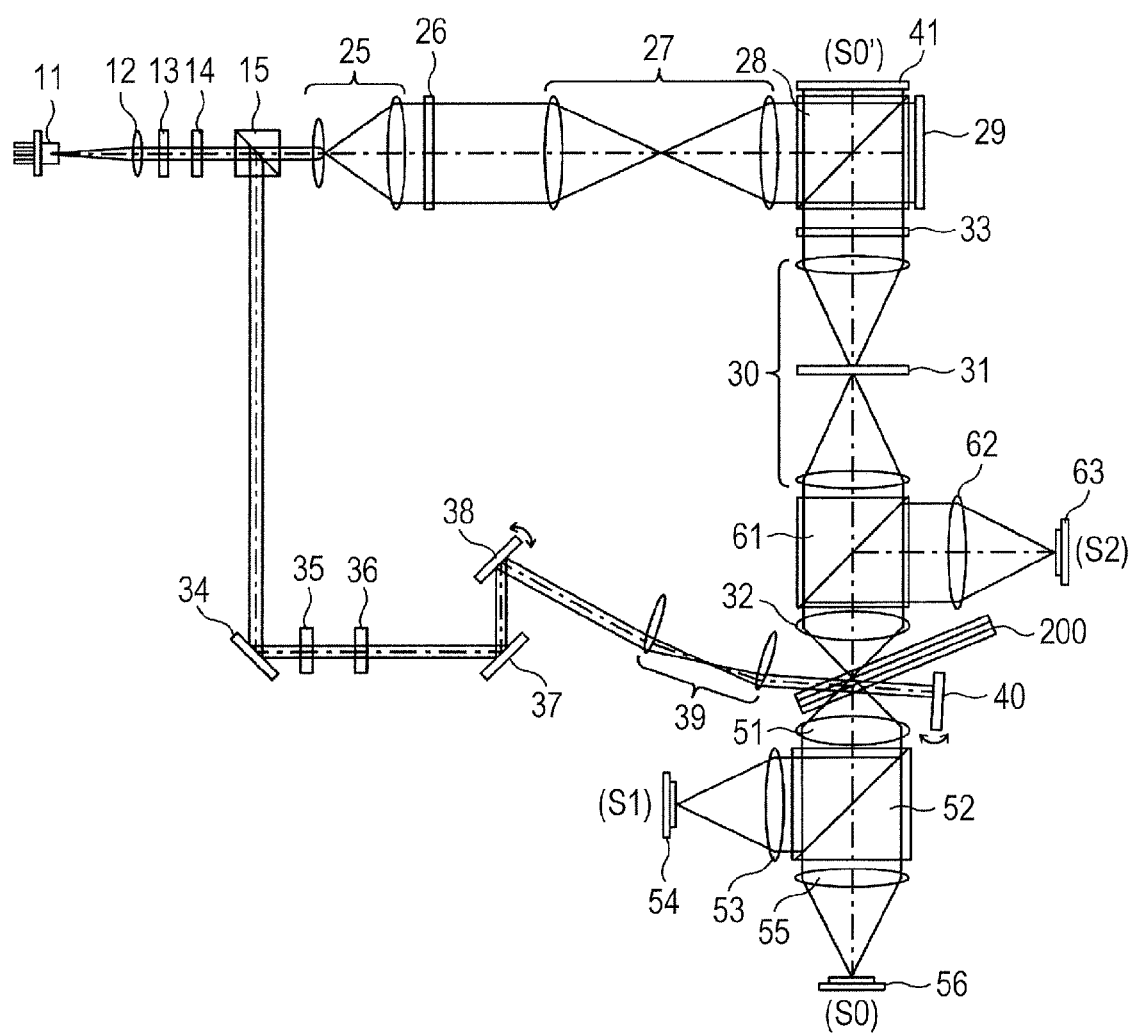
FIG. 1 is a view showing a structure of an optical system of a holographic optical pickup device according to a first embodiment.

Several embodiments according to the present invention will be described referring to the drawings.

First Embodiment

FIG. 1 is a view illustrating a structure of an optical system of a holographic optical pickup device according to a first embodiment. The holographic optical pickup device 100 is configured to irradiate an optical information recording medium with the reference beam and the signal beam to form a hologram so as to record an information signal, or to irradiate the hologram on the optical information recording medium with the reference beam to reproduce the information signal. The structure and operation of the holographic optical pickup device according to this embodiment will be described both in recording and reproducing separately.

<Recording>

Operations in recording will be described. The light beam emitted from a light source 11 is converted to have a desired beam diameter by a Collimator lens 12, and incident on a polarized light variable element 14 after transmitting through a shutter 13. The polarized light variable element 14 converts the light beam into polarized light that contains P-polarized light and S-polarized light. The polarized light variable element 14 serves to convert the light beam into the predetermined polarized light in accordance with recording/reproducing operations. In this case, the light beam is converted into the P-polarized light and S-polarized light in recording, and into the S-polarized light in reproduction. The light beam transmitting through the polarized light variable element 14 is incident on a polarization beam splitter (PBS) prism 15 as a polarization split element which allows transmission of the P-polarized light, and reflects the S-polarized light for splitting the light beam. The light beam transmitting through the PBS prism will be referred to as a signal beam, and the light beam reflected by the prism will be referred to as a reference beam.

The signal beam (P-polarized light) transmitting through the PBS prism 15 is converted to have the desired beam diameter by a beam expander 25, and is incident on a spatial light modulator 29 after transmitting through a phase mask 26, a relay lens 27, and a PBS prism 28. The spatial light modulator 29 adds the information signal such as two-dimensional image data to the signal beam. It is configured, for example, to arrange small elements for performing the polarized light conversion (P-polarized light→S-polarized light) two-dimensionally, and to drive the respective elements in accordance with the information signal to be recorded. The signal beam (S-polarized light) to which the information signal has been added is reflected by the PBS prism 28, and is incident on a polarized light variable element 33. The polarized light variable element 33 converts the light beam into the predetermined polarized light in accordance with recording/ reproducing operations. In this case, the S-polarized light is converted into the P-polarized light in recording. In reproduction, the incident polarized light is directly emitted. The signal beam converted into the P-polarized light is condensed in an optical information recording medium 200 via a relay lens 30 (including a spatial filter 31), a PBS prism 61 and an objective lens 32.

Meanwhile, the reference beam (S-polarized light) reflected by the PBS prism 15 is incident on a galvanometer mirror 38 via a mirror 34, a wavelength plate 35, a Rochon prism 36 and a mirror 37. The wavelength plate 35 and the Rochon prism 36 are optical axis split elements for splitting the incident reference beam into two beams in different polarized states as described later with respect to the reproduction operations. In recording, one of the split beams is used as the reference beam. The reference beam reflected by the galvanometer mirror 38 is incident on the optical information recording medium 200 via a scanner lens 39. The galvanometer mirror 38 is an angular variable element capable of controlling the mirror angle in the arrow direction. This makes it possible to realize the angular multiplexing record while changing the incident angle of the reference beam on the optical information recording medium 200. At this time, the signal beam and the reference beam (double luminous flux) are incident while being laid over with each other so that the interference pattern is formed in the optical information recording medium 200. The interference pattern is recorded in the recording medium as the hologram. In this embodiment, the hologram will be referred to as a "page", and the recorded region where the page is angular multiplexed will be referred to as a "book".

After the information corresponding to one page is recorded in the optical information recording medium 200, the shutter 13 is closed. The information corresponding to one page to be recorded subsequently is displayed by the spatial light modulator 29. Simultaneously, the galvanometer mirror 38 is rotated by a small amount so that the incident angle of the reference beam to the optical information recording medium 200 is changed by θ. Thereafter, when the shutter 13 is opened, the information to be recorded subsequently is recorded at multiplexing angle as a new page of the same book in the optical information recording medium 200. When the page number reaches the predetermined multiplexing number, it is moved to the next recording region (book). Upon movement of the book, the position of the objective lens 32 is fixed, with respect to which the optical information recording medium 200 is moved by a not shown drive unit. The aforementioned operation is repeated to perform the angular multiplexing record in a plurality of blocks.

The reproducing operation will be described. The same explanations as those of the recording operation will be omitted or briefly described. The reference beam (S-polarized beam) reflected by the PBS prism 15 is reflected by the mirror 34, and is incident on the wavelength plate 35. The wavelength plate 35 serves to convert the incident S-polarized beam into the polarized component formed of the P-polarized light and S-polarized light which are orthogonal to each other. The reference beam that has transmitted through the wavelength plate 35 is incident on the Rochon prism 36. The Rochon prism 36 is the optical axis split element that splits the incident reference beam into two different beams in different propagation directions by a small angle φ in accordance with its polarized state. The two light beams transmitting through the Rochon prism 36 have optical properties that the polarized states are substantially orthogonal to each other, and the propagation directions are different. In this case, the P-polarized light beam of two split beams is referred to as the "first light beam" (B1), and the S-polarized light beam is referred to as the "second light beam (B2)". In this embodiment, the first light beam (B1) is used as the "light beam for reference" for detecting the reproduction signal from the optical information recording medium 200, and the second light beam (B2) is used as the "light beam for control" for executing the angular control of the galvanometer mirror 38.

The first and the second light beams transmitting through the Rochon prism 36 are reflected by the mirror 37, and incident on the galvanometer mirror 38 (first angular variable element). The galvanometer mirror 38 is an optical element capable of controlling the angle of the mirror, which accords the incident angle of the light beam for reference (corresponding to the first light beam) on the optical information recording medium 200 with the incident angle in page recording so as to realize reproduction from the respective angular multiplexing recorded pages. The first and the second light beams reflected by the galvanometer mirror 38 are incident on the optical information recording medium 200 via the scanner lens 39. At this time, two diffracted beams in accordance with the incident angle are generated in direction of a lens 51 from the recorded region (page) in the optical information recording medium 200. Those diffracted beams transmit through the lens 51, and are incident on a PBS prism 52 as the polarization split element. Since the diffracted beam generated from the optical information recording medium 200 is in the same polarized state as the state of incidence, the first diffracted beam (P-polarized beam) generated from the first light beam (light beam for reference) transmits through the PBS prism 52. The second diffracted beam (S-polarized beam) generated from the second light beam (light beam for control) is reflected by the PBS prism 52. The first diffracted beam is incident on the light receiver of the photodetector 56 via a detection lens 55. The second diffracted beam is incident on the light receiver of the photodetector 54 via a detection lens 53. The second diffracted beam is used for generating the angular error signal of the galvanometer mirror 38.

Meanwhile, the first and the second light beams transmitting through the optical information recording medium 200 are incident on a galvanometer mirror 40 (second angular variable element). The galvanometer mirror 40 is controlled to allow incidence of the first light beam (for reference) substantially vertically in association with operation of the galvanometer mirror 38 (first angular variable element). In other words, the galvanometer mirror 40 is controlled based on the angular information obtained by conversion from the voltage value (or current value) input to the galvanometer mirror 38. The first light beam incident on the galvanometer mirror 40 is then reflected substantially in a vertical direction (same direction), and is incident on the optical information recording medium 200 again. The second light beam (for control) is reflected toward the direction shifted from the vertical direction, and is incident on the optical information recording medium 200 again. As a result, two diffracted beams toward the objective lens 32 are generated from the recorded region (page) in the optical information recording medium 200. The diffracted beam generated from the reflected first light beam (for reference) is designated as the third diffracted beam. The diffracted beam generated from the reflected second light beam (for control) is designated as the fourth diffracted beam. The third diffracted beam becomes the reproduction beam having the predetermined information recorded on the optical information recording medium 200. The fourth diffracted beam is used for generating the angular error signal of the galvanometer mirror 38. The third and the fourth diffracted beams are incident on the PBS prism 61 as the polarization split element via the objective lens 32. The diffracted beam generated from the optical information recording medium 200 is in the same polarized state as that of incidence. Therefore, the third diffracted beam (P-polarized light) transmits through the PBS prism 61, and the fourth diffracted beam (S-polarized light) is reflected by the PBS prism 61.

The third diffracted beam (reproduction beam) transmitting through the PBS prism 61 is incident on the spatial filter 31 in the relay lens 30. The spatial filter 31 includes an aperture which allows passage only of the diffracted beam from the recorded region (page), and blocks passage of any other diffracted beam. The reproduction beam that has passed through the spatial filter 31 is incident on the polarized light variable element 33 via the relay lens 30. In reproduction, the polarized light variable element 33 emits the incident beam in the polarized state (P-polarized light) directly. Therefore, the reproduction beam as the P-polarized beam transmits through the PBS prism 28, and is incident on an image sensor 41. The image sensor 41 converts the incident reproduction beam into the electrical signal so that the reproduction signal (image data and the like) is generated. Upon completion of reproducing one page, the galvanometer mirror 38 is rotated by a small amount so as to change the incident angle of the light beam for reference on the optical information recording medium 200. Then the next page in the optical information recording medium 200 is reproduced. The aforementioned operation is repeated to generate the reproduction signals of the respective angular multiplexed pages.

Meanwhile, the fourth diffracted beam reflected by the PBS prism 61 is incident on the light receiver of the photodetector via a detection lens 62. Like the second diffracted beam, the fourth diffracted beam is generated from the second light beam (for control). As described below, the incident second light beam (for control) is directed while being shifted with respect to that of the first light beam (for reference) in the opposite direction by the small angle φ.

In this embodiment, the angular error signal of the galvanometer mirror 38 is generated from the differential signal between the second and the fourth diffracted beams. It is assumed that the signal derived from the incident second diffracted beam detected by the photodetector 54 is designated as S1, and the signal derived from the incident fourth diffracted beam detected by the photodetector 63 is designated as S2. The angular error signal (AES) of the galvanometer mirror 38 is expressed by the following formula (1).

$$AES = S1 - S2 \tag{1}$$

Each of the signals S1 and S2 is a summation signal obtained by detecting a total light intensity (or partial light intensity) of the second and the fourth diffracted beams, respectively. There may be the case where a difference of the output level between the signals S1 and S2 occurs in the photodetectors 54 and 63 by factors other than the angular error, for example, a difference in the detection sensitivity and a difference in the optical path length. For this, the influence resulting from such factors may be preliminarily corrected. The galvanometer mirror 38 is driven based on the thus obtained angular error signal (AES), and control is executed so that the angular error signal becomes zero.

The method of detecting the angular error signal according to this embodiment will be described.

Figure 2:
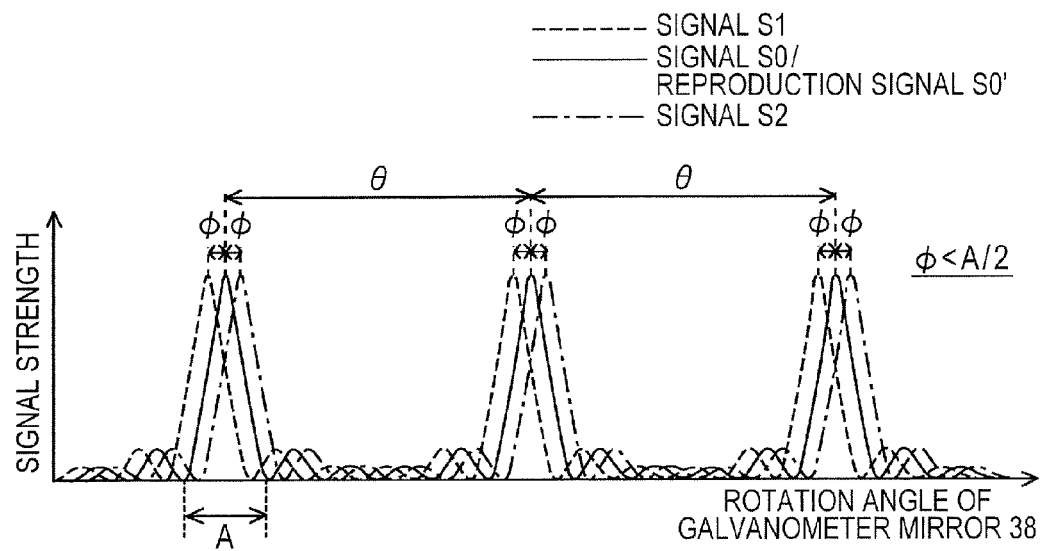
FIG. 2 is a view showing a relationship between a rotation angle of a galvanometer mirror 38 and each strength of the signal detected by the respective photodetectors.

FIG. 2 is a view showing a relationship between the rotation angle of the galvanometer mirror 38, and the strength of the signal detected by the respective photodetectors. It is assumed that the signal derived from the photodetector 56 upon reception of the first diffracted beam is designated as S0, the signal derived from the photodetector 54 upon reception of the second diffracted beam is designated as S1, the reproduction signal derived from the image sensor 41 upon reception of the third diffracted beam (reproduction beam) is designated as S0', and the signal derived from the photodetector 63 upon reception of the fourth diffracted beam is designated as S2. Each of the strengths of the above signals is normalized with the maximum value. The signal strength of the respective photodetectors (each strength of the diffracted beams) is maximized when the angle (incident angle of the reference beam in recording) of the page recorded in the optical information recording medium 200 is accorded with the incident angle of the incident light beam in reproduction. In this case, pages are angular multiplexing recorded while having pages each shifted by a predetermined angle θ. The maximum point of the signal strength occurs at each angle θ.

The signal S0 derived from the photodetector 56 and the reproduction signal S0' derived from the image sensor 41 are generated based on the first light beam (for reference). Those signals are also changed in accordance with the rotation angle of the galvanometer mirror 38, and their normalization curves accord with each other. On the contrary, the signal S1 derived from the photodetector 54 and the signal S2 derived from the photodetector 63 form curves which are shifted with respect to the curve of the signal S0 (reproduction signal S0') by ±ϕ in the rotating angular direction, respectively. The aforementioned shifting is caused by the signals S1 and S2 generated based on the second light beam (for control) in the propagation direction different from the first light beam by the angle ϕ, and the second light beam having the propagation angle inverted (+ϕ→−ϕ) in response to reflection by the galvanometer mirror 40. In this embodiment, the differential signal (S1−S2) between the signals S1 and S2 is obtained by calculating the formula (1) using the aforementioned property to obtain the angular error signal.

Assuming that an incident angle range (rotating angular range) from where the signal S0 (reproduction signal S0') is obtained is set to A, it is preferable to set the relative angular shifting ϕ between the first and second light beams split by the Rochon prism 36 to the value equal to or smaller than A/2. If the relative angular shifting ϕ between those two light beams is larger than the value A/2, each of the signals S1 and S2 may fail to reach sufficient level at the incident angular position at which the signal S0 (reproduction signal S0') is maximized.

Figure 3:
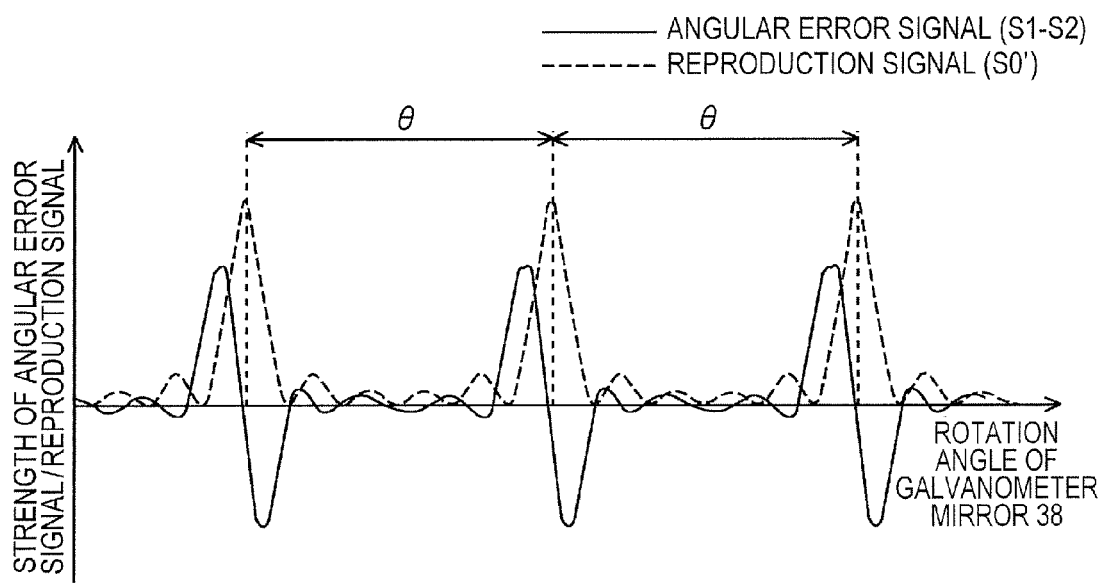
FIG. 3 is a view showing a relationship between the rotation angle of the galvanometer mirror 38 and each angular error signal.

FIG. 3 is a view showing a relationship between the rotation angle of the galvanometer mirror 38 and the angular error signal. The angular error signal (solid line) is derived from the differential signal (S1−S2) between the signals S1 and S2 shown in FIG. 2. At the angular position at which the reproduction signal (dashed line) S0' is maximized, the angular error signal becomes zero. When the reproduction signal is shifted from the maximum point, the angular error signal becomes a positive or negative signal. This clearly shows the condition for driving the galvanometer mirror 38 (rotation angle and direction) for maximizing the reproduction signal with accuracy. By controlling the galvanometer mirror 38 based on the condition, it is possible to perform stable reproduction. Detection of the angular error signal may be realized by controlling so that the rotation angle at which the signals S1 and S2 are maximized is always shifted at the angle of ±ϕ with respect to the rotation angle of the galvanometer mirror 38 which maximizes the reproduction signal S0' (or signal S0). The reason why the respective maximum points of the signals S1 and S2 are shifted by angles ±ϕ will be described hereinafter.

The explanation will be made about the reason why the signal S1 derived from the photodetector 54 is shifted with respect to the signal S0 derived from the photodetector 56. This embodiment is provided with the Rochon prism 36 which splits the light into the first light beam (for reference) and the second light beam (for control) each propagated in a different direction by a small angle ϕ, and allows incidence of the light beams on the optical information recording medium 200. Accordingly the shift exists in the rotation angle of the galvanometer mirror 38 at which the signal strength is maximized by the small angle ϕ between the signal S0 generated from the first light beam and the signal S1 generated from the second light beam. Thereafter the first light beam (for reference) is reflected by the galvanometer mirror 40, and is incident on the optical information recording medium 200 again, thus generating the reproduction beam (reproduction signal S0'). Since the first light beam is vertically reflected by the galvanometer mirror 40, its direction is not changed. Therefore, maximum points of the reproduction signal S0' and the signal S0 are at the same position. The signal S1 derived from the photodetector 54 is shifted with respect to the reproduction signal S0' by the small angle ϕ.

The explanation will be made about the reason why the signal S2 derived from the photodetector is shifted in the opposite direction with respect to the signal S1 derived from the photodetector 54.

Figure 4A:
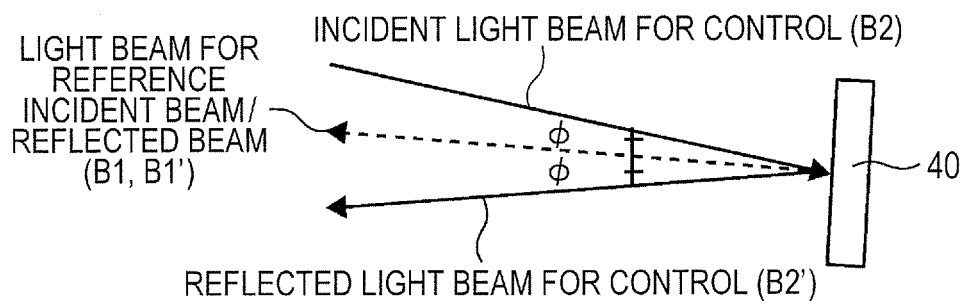
FIGS. 4A and 4B show optical paths of two light beams incident on a galvanometer mirror 40.
Figure 4B:
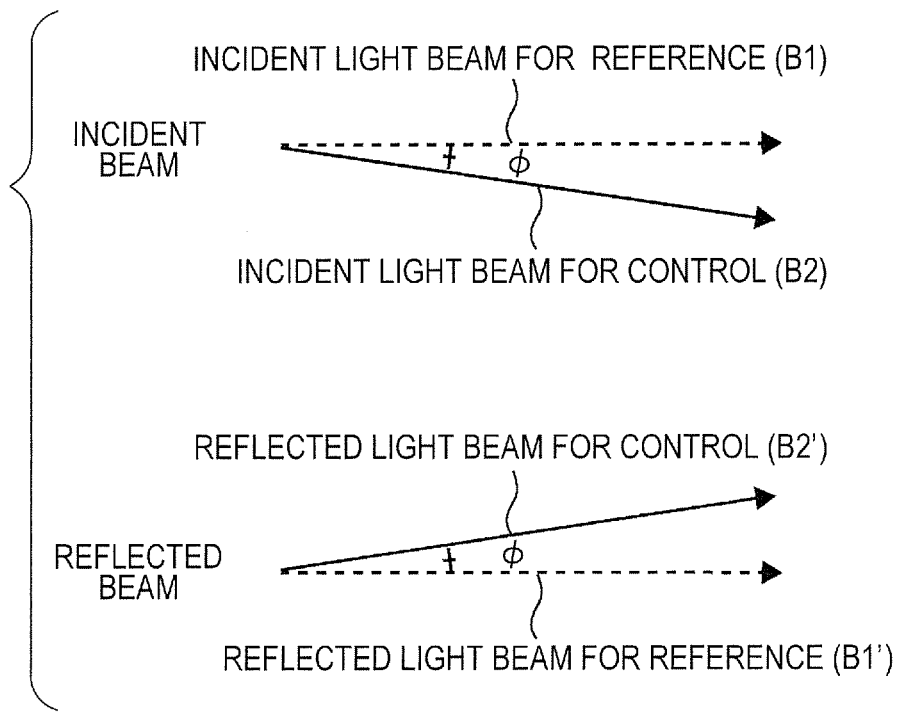

FIGS. 4A and 4B are views showing optical paths of two light beams incident on the galvanometer mirror 40.

FIG. 4A shows an incident beam B1 and a reflected beam B1' of the light beam for reference (first light beam), and an incident beam B2 and a reflected beam B2' of the light beam for control (second light beam). The incident beam B1 of the light beam for reference is vertically incident on the galvanometer mirror 40, and the resultant reflected beam B1' is returned to the same optical path. Meanwhile, the incident beam B2 of the light beam for control is incident on the galvanometer mirror 40 while being inclined at the angle ϕ from the vertical direction of the galvanometer mirror 40. Then the resultant reflected beam B2' is projected while being inclined at the angle ϕ at the opposite side from the vertical direction.

FIG. 4B shows each relative angle of the light beam for both control with respect to the light beam for reference for the incident beam and the reflected beam, respectively. As for the incident beam, the light beam for control B2 is inclined with respect to the light beam for reference B1 by the angle ϕ downward in the drawing. Meanwhile, the light beam for control B2' is inclined with respect to the light beam for reference B1' by the angle ϕ upward in the drawing. The propagation direction of the light beam for control has the relative angle inverted when it is reflected by the galvanometer mirror 40.

The signals S1 and S2 are generated from the light beams for control B2 and B2', respectively. The maximum points of the signals S1 and S2 are shifted with respect to the maximum point of the reproduction signal S0' in opposite directions by the angles ±ϕ, respectively.

The angular error signal of the galvanometer mirror 38 is detected by calculating the difference between the signals S1 and S2, and executes the control so that the error signal becomes zero. This makes it possible to perform the stable reproduction. At this time, compared with the control method based on the image signal from the image sensor 41, the photodetectors 54 and 63 configured to detect light intensity only are capable of driving at high frequency, resulting in easy high-speed control. Since the rotation angle of the galvanometer mirror 38 is controlled so that the reproduction light intensity is at the maximum point, it is possible to always provide the best reproduction signal S0'.

This embodiment may be modified as described below.

When reproducing the optical information recording medium 200 with high recording density (page density), the spatial filters may be provided to the front of the respective photodetectors 54, 56, and 63 for avoiding incidence of the diffracted beam from the adjacent recorded region on the photodetector for the angular error signal. The detection optical system (PBS prism 61 and detection lens 62) of the photodetector 63 may be provided between the spatial filter 31 and the image sensor 41.

The Rochon prism 36 is employed as the optical axis split element for splitting the reference beam into two light beams in different propagation directions and diffracted states. However, it is possible to use a Wollaston prism, a polarization diffracted element, the polarization phase plate and the like without being limited to the Rochon prims.

The galvanometer mirrors 38 and 40 are employed as the angular variable elements. However, it is possible to use the acousto-optic device, MEMS (Micro Electro Mechanical Systems) and the like without limitation.

The wavelength plate 35 may be employed as the polarized light variable element so as to change the polarized state in accordance with the recording/reproducing operations. In other words, it may be configured to perform conversion into the polarized light with P-polarized light and S-polarized light only in reproduction, and to keep the polarized state as it is in recording. As a result, the Rochon prism 36 serves to split the light into two light beams in reproduction, and allows the single light beam to be propagated in recording. This makes it possible to increase the light intensity of the light beam incident on the optical information recording medium 200.

As described above, the holographic optical pickup device of this embodiment is configured to allow the optical axis split element represented by the Rochon prism to split the reference beam into two light beams in different propagation directions having the polarized light states substantially orthogonal to each other.

When the reference beam reflected by the first angular variable element (38 of FIG. 1) represented by the galvanometer mirror is incident on the optical information recording medium, the diffracted beam with predetermined polarization component is detected by the first detector (54 of FIG. 1) from the diffracted beam generated from the recorded region in the optical information medium using the polarization split element represented by the PBS prism. When the reference beam reflected by the second angular variable element (40 of FIG. 1) represented by the galvanometer mirror is incident on the optical information recording medium, the diffracted beam with predetermined polarization component is detected by the second detector (63 of FIG. 1) from the diffracted beam generated from the recorded region in the optical information recording medium using the polarization split element.

Then the angular error signal of the first angular variable element is generated from the first signal S1 derived from the first photodetector and the second signal S2 derived from the second photodetector.

Second Embodiment

Figure 5:
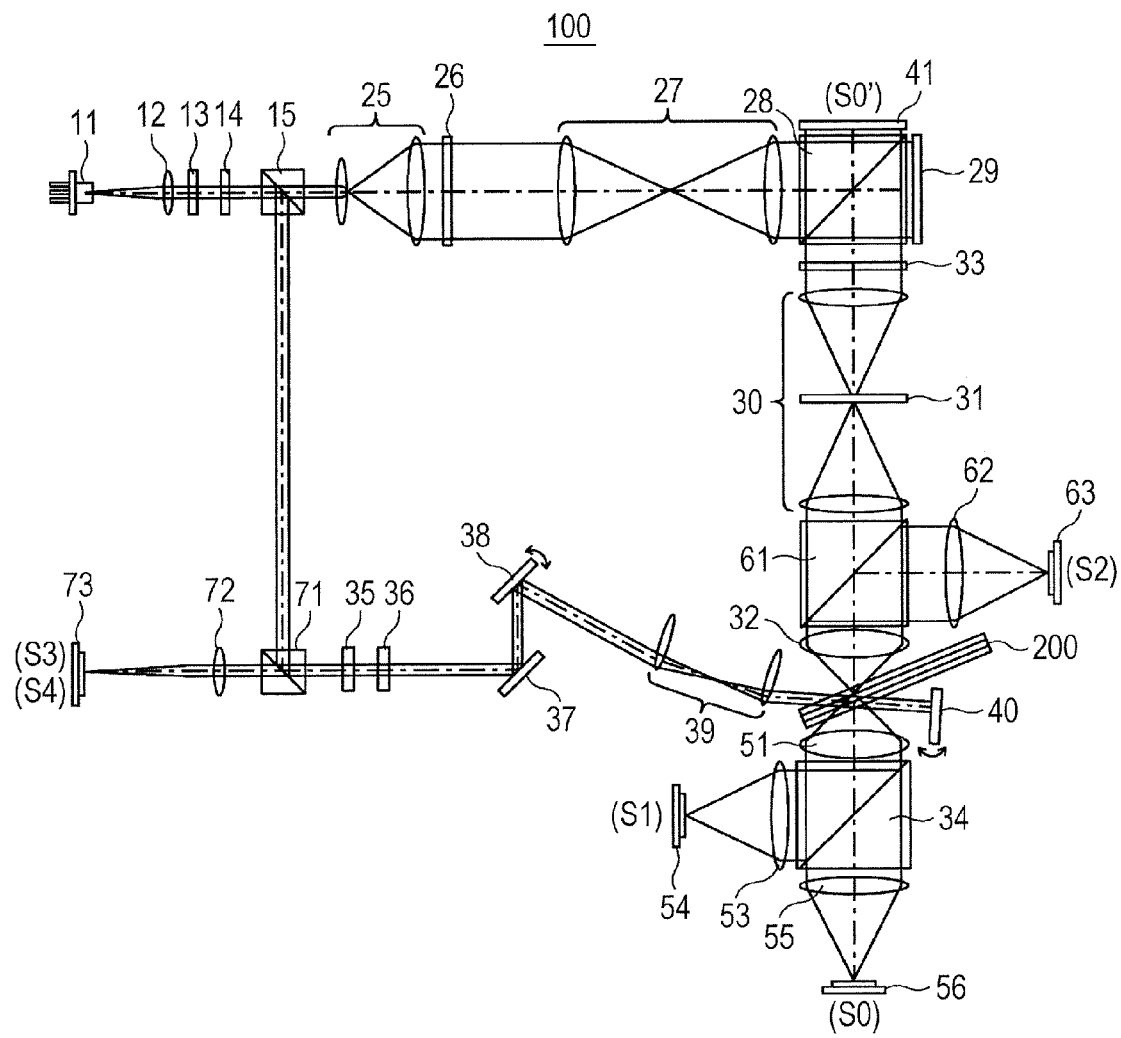
FIG. 5 is a view showing a structure of an optical system of the holographic optical pickup device according to a second embodiment.

FIG. 5 shows a structure of an optical system of the holographic optical pickup device according to a second embodiment. This embodiment is formed by adding the detection optical system for controlling the galvanometer mirror 40 (second angular variable element) to the structure of the first embodiment (FIG. 1). The added detection optical system according to the second embodiment includes a PBS prism 71, a detection lens 72, and a photodetector 73. The signal output from the photodetector 73 is used to execute the angular control of the galvanometer mirror 40 (second angular variable element). The signal for controlling the galvanometer mirror 40 will be referred to as a second angular error signal. The angular error signal of the galvanometer mirror 38 (first angular variable element) will be referred to as a first angular error signal.

The galvanometer mirror 40 described in the first embodiment is controlled by obtaining the rotation angle so that the light beam for reference (first light beam) is vertically incident on the galvanometer mirror 40 based on the condition (rotation angle) for controlling the galvanometer mirror 38 (first angular variable element). In this case, there may be the case where the galvanometer mirror 40 tends to be slightly shifted from the optimum rotation angle under the influence of disturbance such as temperature fluctuation. As a result, the reflected beam B1' of the light beam for reference (first light beam) is not in line with the direction of the incident beam B1 as shown in FIGS. 4A and 4B. Then the angles of the incident beam B2 and the reflected beam B2' of the light beam for control (second light beam) are shifted from the predetermined angles ±ϕ, thus bringing the state out of balance. In other words, the maximum point of the reproduction signal S0' cannot be obtained in spite of use of the angular error signal derived from the differential signal between the signals S1 and S2.

Meanwhile, the second embodiment is configured to directly detect the propagation direction of the first light beam reflected by the galvanometer mirror 40 so as to control that the reflected beam is returned in the vertical direction, that is, the same direction as that of the incident beam. This makes it possible to allow the first light beam (for reference) to be always reflected in the vertical direction even if disturbance occurs, resulting in a stable reproduction signal.

The operation of the second embodiment will be described. The first angular error signal of the galvanometer mirror 38 (first angular variable element) is generated like the first embodiment. The second angular error signal is generated using the first light beam (for reference) that has been reflected by the galvanometer mirror 40 (second angular variable element), and then transmitted through the optical information recording medium 200.

The first light beam (for reference) that has transmitted through the optical information recording medium 200 is incident on the PBS prism 71 via the relay lens 39, the galvanometer mirror 38, a mirror 37, the Rochon prism 36, and the wavelength plate 35. In this case, the light beam for reference which transmits through the wavelength plate 35 twice contains both polarization components of the P-polarized light and S-polarized light. A part of the light beam for reference (component of P-polarized light) transmits through the PBS prism 71. A part of the light beam for reference which has transmitted through the PBS prism 71 is incident on a photodetector 73 via the detection lens 72. The photodetector 73 generates a second angular error signal (SAES) with respect to the galvanometer mirror 40 (second angular variable element).

Figure 6:
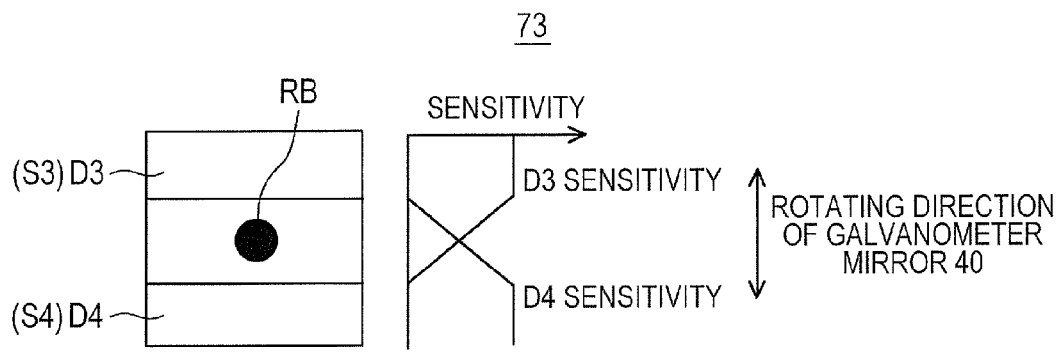
FIG. 6 is a view showing a structure of a light receiver of a photodetector 73.

FIG. 6 is a view showing a structure of a light receiver of the photodetector 73. The photodetector 73 includes the light receiver (light receiving planes D3 and D4), having at least two divided sections in the rotation direction of the galvanometer mirror 40. A code RB denotes the spot of the incident light beam for reference. In this case, assuming that signals derived from the light receiving planes D3 and D4 are designated as signals S3 and S4, the second angular error signal (SAES) is expressed by the following formula (2).

$$SAES = S3 - S4 \quad (2)$$

In this embodiment, the space between the light receiving planes D3 and D4 is illustrated by the dark line indicating that the signal is detected on both the light receiving planes. However, the beam diameter of the light beam for reference may be increased so as to allow detection of the signal by the light receiver with a simple parting line.

The second angular error signal may be detected by calculating as described above for the following reason. That is, if the incident angle of the first light beam (for reference) on the galvanometer mirror 40 (second angular variable element) is shifted from the vertical direction, the propagation direction of the light beam for reference which has been reflected by the galvanometer mirror 40 is shifted. In association with this, the position of the light beam for reference incident on the photodetector 73 is shifted as well. As FIG. 6 shows, the spot RB of the light receiver moves up and down. Such movement is detected by the light receiver (light receiving planes D3 and D4) having two divided sections so as to provide the angular error of the galvanometer mirror 40 from the resultant difference. In this embodiment, the light intensity resulting from the positional shifting is made large by reducing the beam diameter using the detection lens 72.

This embodiment may be modified as follows.

Figure 7:
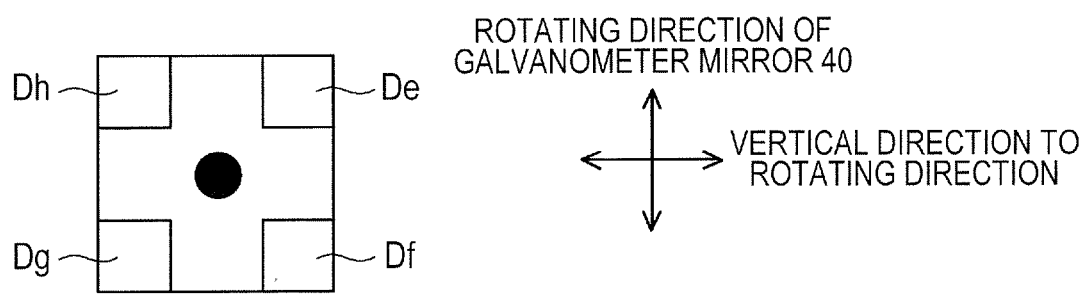
FIG. 7 is a view showing another structure of a light receiver of a photodetector 73.

FIG. 7 is a view showing another exemplary structure of the light receiver of the photodetector 73. As FIG. 6 shows, the light receiver of the photodetector 73 is divided into two sections in the rotating direction of the galvanometer mirror 40. However, the light receiver may further be divided into four sections as shown in FIG. 7 without being limited to the aforementioned embodiment. It is possible to generate the angular error signal not only in the rotation direction of the galvanometer mirror 40 but also in the vertical direction using four light receiving planes De, Df, Dg and Dh.

The detection optical system for controlling the galvanometer mirror 40 may be provided at any location so long as it is positioned on the optical path of the light beam for reference. The detection optical system for controlling the galvanometer mirror 40 and the detection method according to this embodiment are not dependent on the optical system for controlling the galvanometer mirror 38. Therefore, the control optical system of the aforementioned galvanometer mirror 40 may be applied directly even if the optical system for controlling the galvanometer mirror 38 is differently configured.

This embodiment employs the photodetector 73 with the light receiver that has been divided into two sections. However, the position detection sensor such as the position detection element may be employed. The galvanometer mirror 40 may be controlled even if the Rochon prism 36 is not provided, which is not depending on the control method of the galvanometer mirror 38.

In this way, the holographic optical pickup device is configured to include an optical system for detecting the light reflected by the second angular variable element (40 of FIG. 5) for generating the light beam conjugated with the reference beam upon reproduction of the optical information recording medium. This optical system includes at least the photodetector (73 of FIG. 5), and the photodetector has at least one light receiver that is divided into at least two sections.

The first and the second embodiments are configured to ensure control operations other than the angular control of the galvanometer mirror using the signal S0 derived from the photodetector 56. For example, the signal amplification efficiency of the signal S1 may be controlled using the strength of the signal S0 derived from the photodetector 56. Furthermore, it is possible to generate the position error signal with respect to the recorded region and the focus error signal from the photodetectors 56, 54 or 63.

Figure 8:
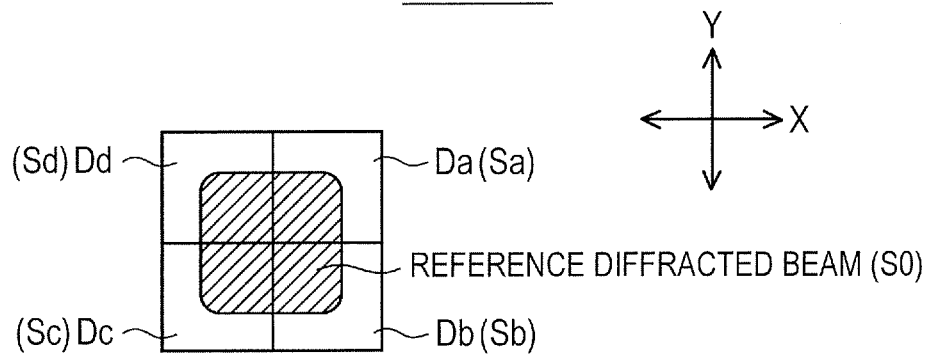
FIG. 8 is a view showing another exemplary structure of a light receiver of a photodetector 56 (or 54, 63)

FIG. 8 is a view showing another exemplary structure of the light receiver of the photodetector 56 (or 54, 63). The light receiver is divided into four light receiving planes Da, Db, Dc and Dd, and calculation is carried out to obtain those signals to allow detection of the position error signal of the recorded region of the optical information recording medium 200. The detection is performed using the phenomenon that the position of the diffracted beam (S0) incident on the photodetector 56 is shifted as positional shifting on the medium where the diffracted beam is generated. Assuming that signals derived from the light receiving planes Da, Db, Dc and Dd are designated as Sa, Sb, Sc and Sd, the positional error signals (XPES, YPES) on the optical information recording medium may be expressed by the following formulae (3x) and (3y).

$$XPES=(Sa+Sb)-(Sc+Sd) \quad (3x)$$

$$YPES=(Sa+Sd)-(Sb+Sc) \quad (3y)$$

The aforementioned structure makes it possible to perform not only the angular control of the galvanometer mirror 38 but also control of the relative position between the optical information recording medium 200 and the holographic optical pickup device.

Third Embodiment

Figure 9:
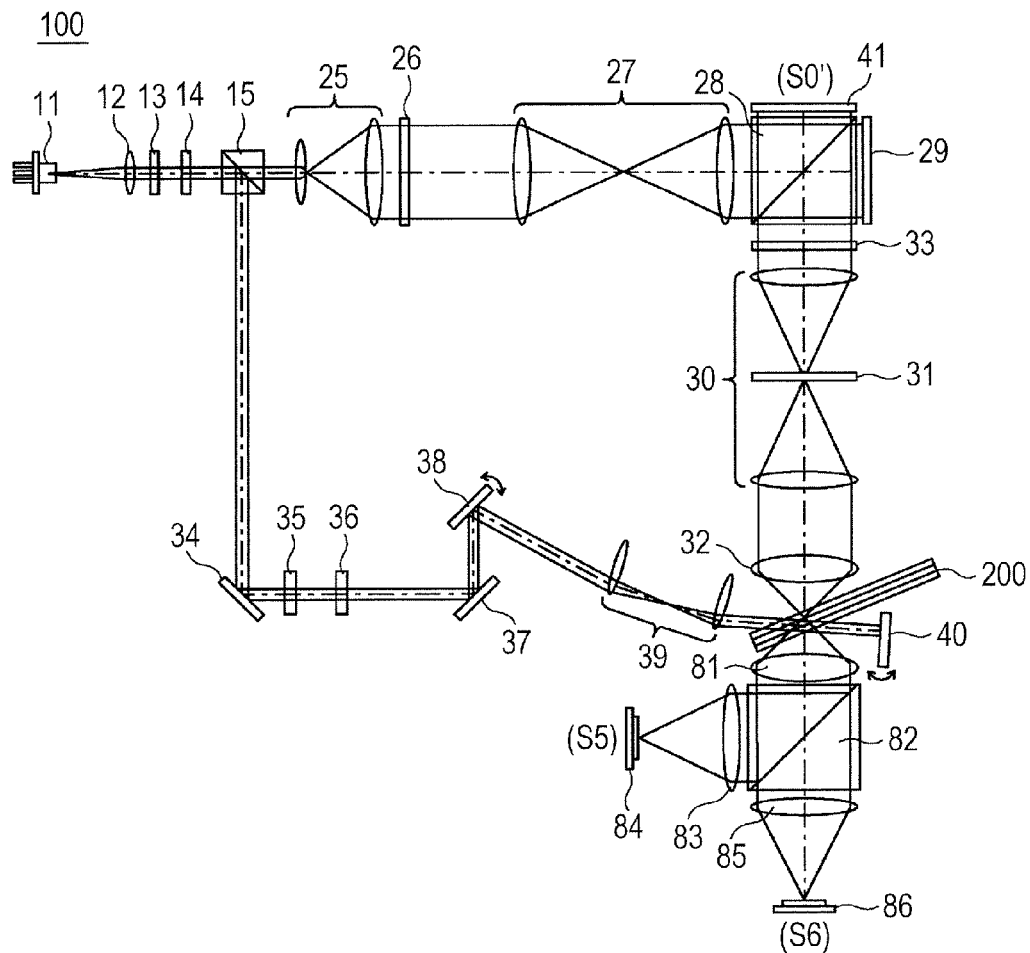
FIG. 9 is a view showing a structure of an optical system of the holographic optical pickup device according to a third embodiment.

FIG. 9 is a view showing a structure of an optical system of a holographic optical pickup device according to a third embodiment. This embodiment is configured by removing the optical system including the PBS prism 61, the lens 62 and the photodetector 63 provided between the objective lens 32 and the relay lens 30 in the structure of the first embodiment (FIG. 1). Codes of the optical parts according to the first embodiment, that is, 51 to 56 are changed to 81 to 86 of the corresponding optical parts according to the third embodiment. This configuration ensures the angular control of the galvanometer mirror 38, and realizes the compact structure and lower costs compared with the first embodiment. The difference in the reproduction operation between the first and the third embodiments will be described.

Like the first embodiment, the reference beam reflected by the mirror 34 is split by the wavelength plate 35 and the Rochon prism 36 into two beams in different polarized states and propagation directions (angular difference φ). The light beam of the P-polarized light of the two beams is referred to as the first light beam (B1), and the other S-polarized beam is referred to as the second light beam (B2). In the third embodiment, those light beams are used as the light beams for control so as to execute the angular control of the galvanometer mirror 38. The first light beam (B1') transmitting through the optical information recording medium 200 and reflected by the galvanometer mirror 40 (second angular variable element) is used as the light beam for reference so as to detect the reproduction signal from the optical information recording medium 200.

The first and the second light beams (both for control) in different polarized states and propagation directions are reflected by the galvanometer mirror 38 (first angular variable element), and incident on the optical information recording medium 200 via the scanner lens 39. At this time, two diffracted beams in accordance with the incident angle are generated toward the lens 81 from the recorded region in the optical information recording medium 200. Those diffracted beams transmit through the lens 81, and are incident on the PBS prism 82. A first diffracted beam (P-polarized light) generated from the first light beam (B1) transmits through the PBS prism 82, and the second diffracted beam (S-polarized light) generated from the second light beam (B2) is reflected by the PBS prism 82. The first diffracted beam is incident on the light receiver of the photodetector 86 via the detection lens 85. The second diffracted beam is incident on the light receiver of the photodetector 84 via the detection lens 83.

Assuming that a signal derived from the photodetector 84 is designated as S5, and a signal derived from the photodetector 86 is designated as S6, the angular error signal (AES) of this embodiment is expressed by the following formula (4).

$$AES=S5-S6 \quad (4)$$

Each of the signals S5 and S6 is a summation signal obtained by detecting a total light intensity (or partial light intensity) of the first and the second diffracted beams, respectively. There may be the case where a difference of the output level between the signals S5 and S6 occurs in the photodetectors 84 and 86 by factors other than the angular error, for example, a difference in the detection sensitivity and a difference in the polarized component of the diffracted beam. The resultant influence is expected to be preliminarily corrected. The galvanometer mirror 38 is driven based on the thus obtained angular error signal (AES), and control is executed so that the angular error signal becomes zero.

Meanwhile, the first and the second light beams transmitting through the optical information recording medium 200 are incident on the galvanometer mirror 40 (second angular variable element). The third embodiment is configured to control the galvanometer mirror 40 so as to receive incidence of the first light beam while being inclined from the vertical direction at a predetermined angle. The first light beam reflected by the galvanometer mirror 40 is used as the light beam for reference for detecting the reproduction signal from the optical information recording medium 200.

The first light beam (for reference) and the second light beam which have been reflected by the galvanometer mirror 40 transmit through the optical information recording medium 200 again so that the third diffracted beam (reproduction beam) with the predetermined information is generated from the recorded region by the first light beam (for reference), and directed toward the objective lens 32. The reproduction beam is incident on the image sensor 41 via the relay lens 30, the spatial filter 31, the polarized light variable element 33, and the PBS prism 28. The reproduction image data are generated based on the reproduction beam incident on the image sensor 41.

The description is made about the inclined angle of the galvanometer mirror 40, which is set for providing the optimum condition for the third diffracted beam (reproduction beam) in accordance with the angular error signal generated by the formula (4).

Figure 10:
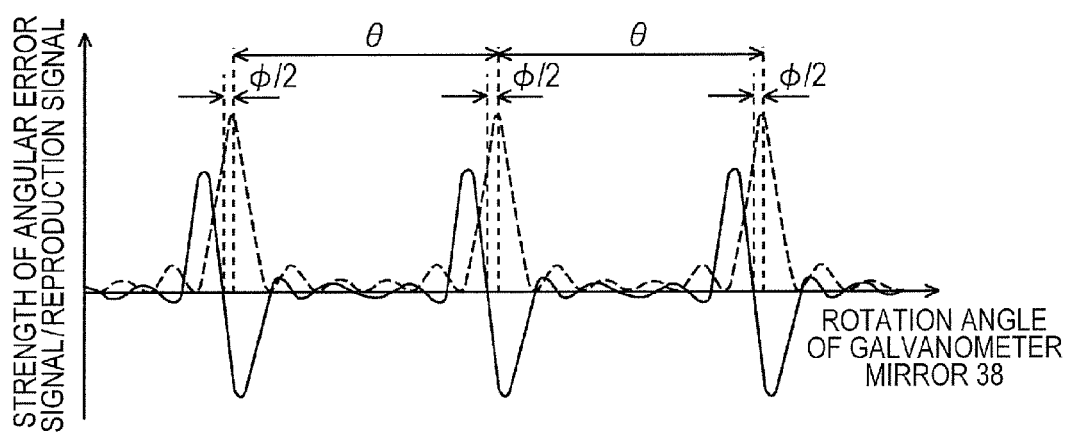
FIG. 10 is a view showing a relationship of the angular error signal and the reproduction signal with the rotation angle of the galvanometer mirror 38.

FIG. 10 is a view showing a relationship between the angular error signal and the reproduction signal, and the rotation angle of the galvanometer mirror 38. The case where the first light beam is vertically incident on the galvanometer mirror 40 like the first embodiment will be shown for comparative purpose. Referring to FIG. 3, in the first embodiment, the maximum point of the reproduction signal S0' accords with the minimum point (zero) of the angular error signal (S1−S2). On the contrary, FIG. 10 shows that the maximum point of the reproduction signal S0' is shifted from the minimum point (zero) of the angular error signal (S5−S6) by the angle $\phi/2$.

In order to solve the problem of angular shifting, this embodiment is configured to control the galvanometer mirror 40 so as to generate the angular difference $\phi/2$ in the propagation direction between the first light beam incident on the galvanometer mirror 40 and the first light beam reflected by the galvanometer mirror 40. In other words, the galvanometer mirror 40 is inclined from the posture vertical to the incident first light beam by the angle $\phi/4$. This makes it possible to allow the maximum point of the reproduction signal S0' to accord with the minimum point (zero) of the angular error signal (S5−S6). Specifically, the galvanometer mirror 40 may be controlled in association with the drive condition for the galvanometer mirror 38 by adding the angle of $\phi/4$.

This may change the condition of the relative angle $\phi$ between two light beams split by the Rochon prism 36. Assuming that the incident angle range of the light beam for reference for obtaining the reproduction beam is designated as A, the preferable relative angle $\phi$ is equal to or smaller.

The present invention is configured to control the galvanometer mirror 38 by generating the angular error signal using the signals S5 and S6 derived from the two split light beams. Use of the light beam for reference, which has the propagation direction of the light beam changed by $\phi/2$ using the galvanometer mirror 40, ensures control so that the reproduction signal is maximized in accordance with the minimum point of the angular error signal. This makes it possible to realize the compact structure and lower costs compared with the first embodiment.

The holographic optical pickup device according to this embodiment is configured to split the diffracted beam generated from the recorded region in the optical information recording medium using the polarization split element represented by the PBS prism, and detect the first polarized component by the first detector (84 of FIG. 9), and the second polarized component by the second detector (86 of FIG. 9) upon incidence of the reference beam reflected by the first angular variable element (38 of FIG. 9) on the optical information recording medium. The first polarized component and the second polarized component are orthogonal to each other. The device is further configured to generate the angular error signal of the first angular variable element from the first signal S5 derived from the first photodetector and the second signal S6 derived from the second photodetector.

This embodiment may be modified as described below.

Figure 11:
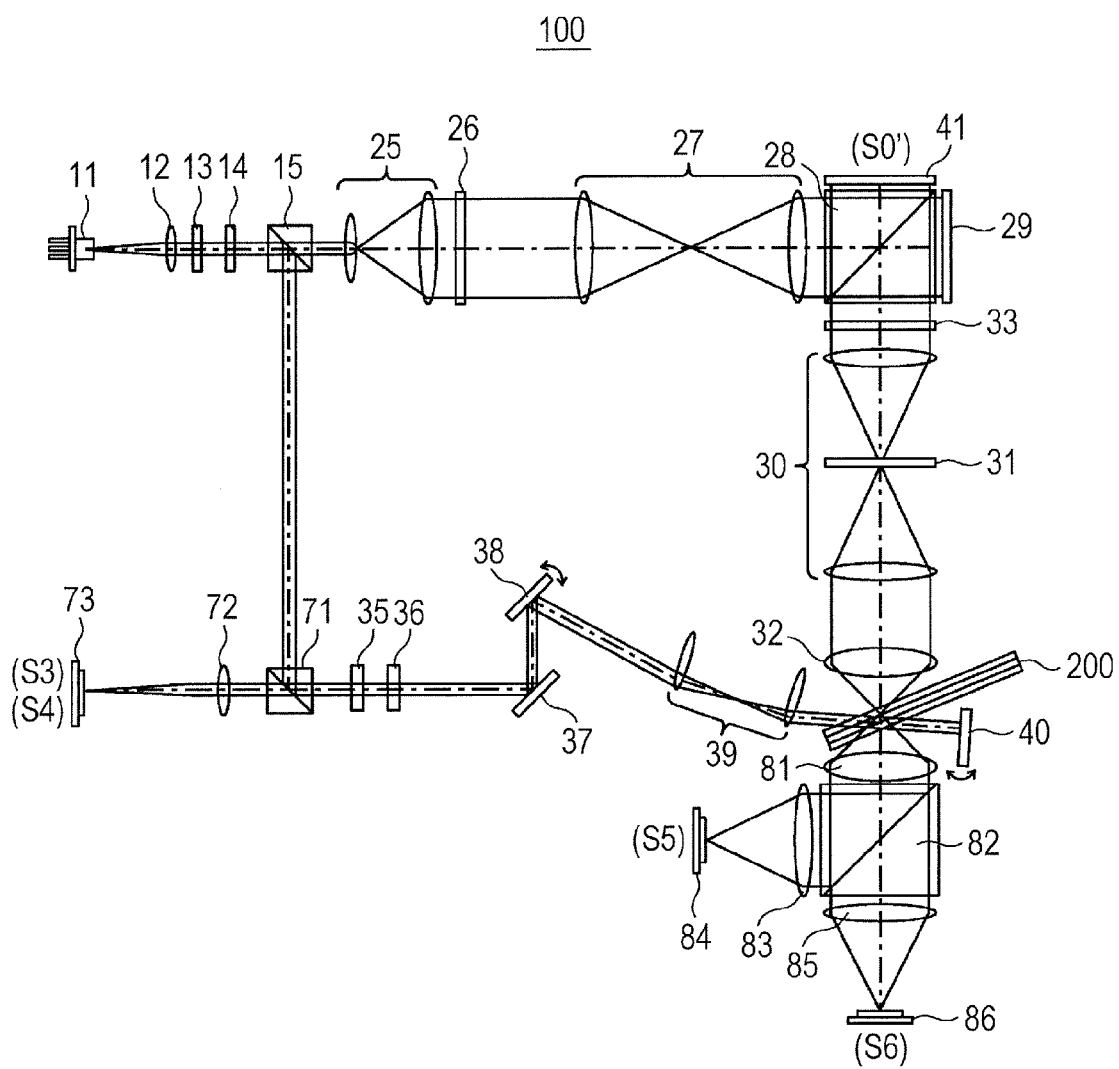
FIG. 11 is a view showing a structure of the optical system formed by combining the structure shown in FIG. 5 with the structure shown in FIG. 9.

FIG. 11 is a view showing a structure of an optical system of the holographic optical pickup device formed by combining the structure of the second embodiment (FIG. 5) with the structure shown in FIG. 9. That is, a PBS prism 71, a detection lens 72, and a photodetector 73 are added to form the detection optical system for controlling the galvanometer mirror 40 (second angular variable element). In this case, the control is executed so that the incident light and the reflected light of the first optical beam with respect to the galvanometer mirror 40 are shifted by the angle $\phi/2$. For this, the position of the light receiver of the photodetector 73 may be mechanically adjusted or adjusted by applying electrical offset.

If the recording is in the high density state sufficient to allow the diffracted beam from the adjacent recorded region to be incident on the photodetector for angular error signal in the third embodiment, the spatial filters may be provided to the front of the respective photodetectors 84 and 86.

The diffracted beams split by the PBS prism 82 are detected by the different photodetectors 84 and 86. Alternatively, they may be detected by different light receivers of the single photodetector using the polarized diffraction grating and the PBS prisms each having a different shape.

The light receiver of the photodetector 84 or 86 may be divided into a plurality of light receiving planes, and calculation is carried out to obtain the signals therefrom to generate the position error signal and the focus error signal.

In the third embodiment, the image sensor 41 for detecting the reproduction beam is provided at the same side as the spatial light modulator 29 with respect to the optical information recording medium 200, which is not limited thereto. For example, it is possible to provide the image sensor 41 at the side opposite the spatial light modulator 29 with respect to the optical information recording medium 200 so as to be shared by the photodetectors 84 and 86 for the angular error signal detection of the galvanometer mirror 38. In this case, it is advantageous that the galvanometer mirror 40 (second angular variable element) does not have to be installed. The galvanometer mirror 38 (first angular variable element) only serves to control the angle, resulting in easy control.

Fourth Embodiment

Figure 12:
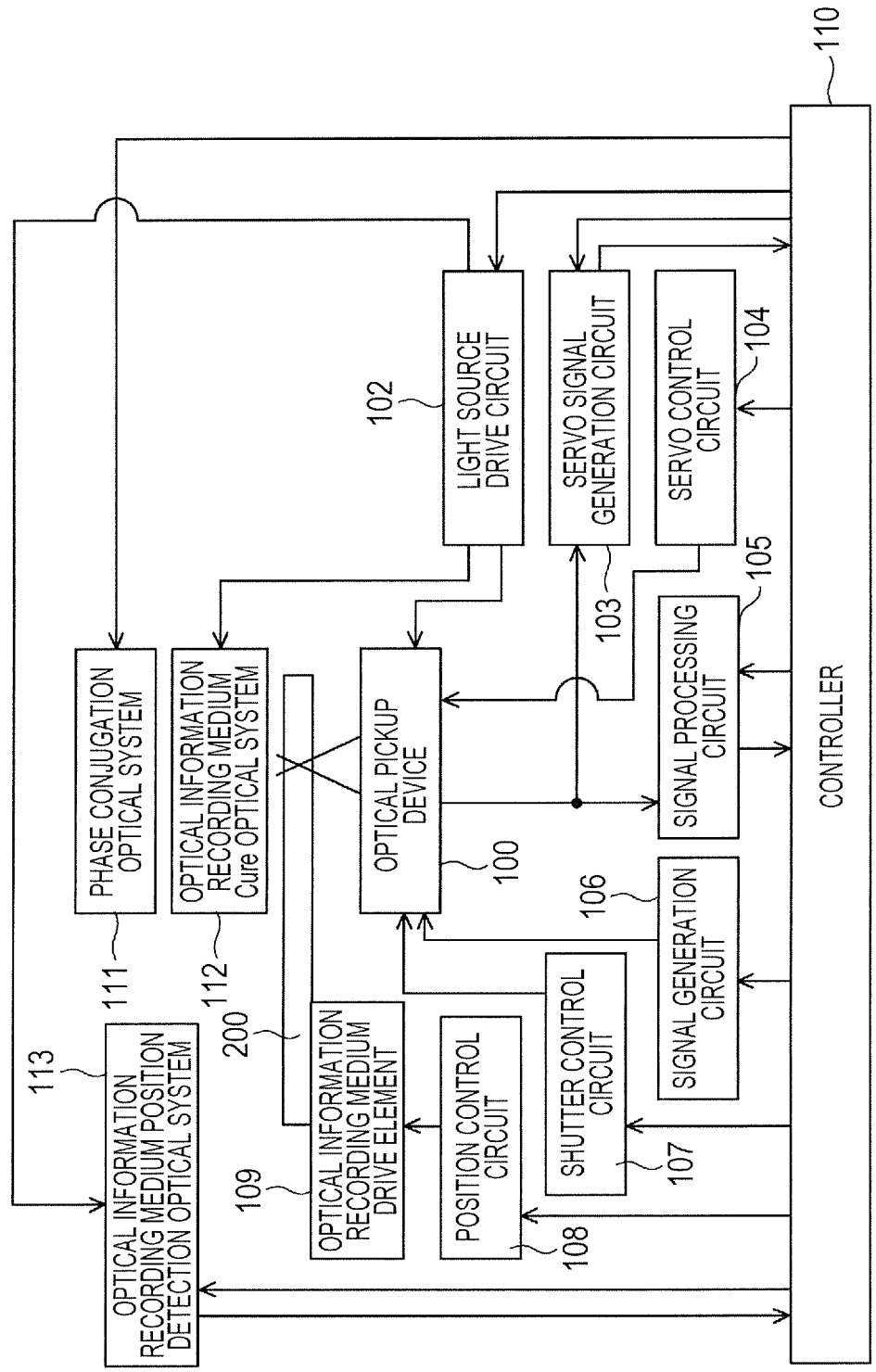
FIG. 12 is a block diagram of an optical information recording and reproducing device according to a fourth embodiment.

FIG. 12 shows a structure of an optical information recording and reproducing device according to a fourth embodiment. The optical information recording and reproducing device records and/or reproduces the information signal by forming the hologram on the optical information recording medium. The optical information recording and reproducing device is configured to have the mechanism/optical system, for example, an optical information recording medium drive element 109, a phase conjugate optical system 111, an optical information recording medium Cure optical system 112, and an optical information recording medium position detection optical system 113 in addition to the optical pickup device 100 as described in the respective embodiments. The optical information recording medium 200 is configured to change the relative recording/reproducing position with respect to the optical pickup device 100. The optical pickup device 100 shown in FIGS. 1, 5, 9 and 11 includes the phase conjugate optical system 111 (corresponding to the galvanometer mirror 40).

The optical pickup device 100 irradiates the optical information recording medium 200 with the reference beam and the signal beam to form the hologram so as to record the information signal. The device irradiates the hologram on the optical information recording medium 200 with the reference beam to reproduce the information signal. Circuits as described below are provided as the control system of the recording and reproducing operations, and are controlled by a controller 110.

The information signal to be recorded is transmitted to the spatial light modulator (29 of FIG. 1) in the optical pickup device 100 via a signal generation circuit 106 so that the signal beam is modulated by the spatial light modulator. When reproducing the information signal recorded on the optical information recording medium 200, the phase conjugate beam of the reference beam emitted from the optical pickup device 100 is generated by the phase conjugate optical system 111. The phase conjugate beam denotes the light wave that proceeds in the inverse direction while holding the same wave front as that of the input beam. The reference beam reflected by the galvanometer mirror 40 described referring to FIG. 1 corresponds to the phase conjugate beam. The diffracted beam (recovered beam) generated by the phase conjugate beam is detected by the image sensor (41 of FIG. 1) in the optical pickup device 100 so that a signal processing circuit 105 generates the reproduction signal.

A light source drive circuit 102 supplies predetermined light source drive current to light sources in the optical pickup device 100, the optical information recording medium Cure optical system 112, and the optical information recording medium position detection optical system 113. The light beam with predetermined intensity is emitted from the respective light sources. A shutter control circuit 107 controls the time for opening and closing the shutter (13 of FIG. 1) within the optical pickup device 100 so as to adjust the time taken for irradiating the optical information recording medium 200 with the reference beam and the signal beam. The optical information recording medium Cure optical system 112 generates the light beam used for the pre-cure and post-cure operations on the optical information recording medium 200. The pre-cure denotes the pre-process for preliminarily projecting the predetermined light beam before irradiating the desired position of the optical information recording medium 200 with the reference beam and the signal beam. The post-cure denotes the post-process for projecting the predetermined light beam so as not to allow the information to be recorded once it has been recorded on the desired position of the optical information recording medium 200. The optical information recording medium position detection optical system 113 detects a general position of the optical information recording medium 200, and allows the position control circuit 108 to adjust the general position of the optical information recording medium 200 using the detection signal.

The recording method using hologram is capable of recording the information with extra-high density. However, the method significantly narrows the acceptable error with respect to inclination and displacement of the optical information recording medium 200. For this reason, this embodiment is configured to generate the angular error signal with respect to the galvanometer mirror using the signal output from the optical pickup device 100. The servo signal generation circuit 103 generates the angular error signal for servo control using signals output from the photodetectors 54, 56, 84 and 86, and the servo control circuit 104 corrects the angular shifting amount of the light beam for reference by driving the galvanometer mirror 38 in the optical pickup device 100.

The optical pickup device 100, the phase conjugate optical system 111, the optical information recording medium Cure optical system 112, and the optical information recording medium position detection optical system 113 may have some or all of the optical systems combined into a single structure for simplification.

The optical information recording and reproducing device according to this embodiment includes the optical pickup device 100 according to the first to the third embodiments so that the angular error signal is generated using the signal output from the photodetector in the optical pickup device. This makes it possible to realize high-speed reproduction and to provide the best reproduction signal using the aforementioned angular error signal.

It is to be understood that the present invention is not limited to any of the aforementioned embodiments, and may include various modified examples. The aforementioned embodiments have been described in detail for providing a comprehensible explanation of the present invention, and are never limited to the one provided with all the structures as described above. It is possible to add the structure of any one of the embodiments to that of the other embodiment. Alternatively, a part of the structure of any one of the embodiments may be added to, deleted from, and replaced with the other structure of the embodiment.

What is claimed is:

1. A holographic optical pickup device for recording an information signal by irradiating an optical information recording medium with a reference beam and a signal beam to form a hologram, or reproducing the information signal by irradiating the hologram on the optical information recording medium with the reference beam, comprising:
   a light source for emitting a light beam;
   a split element for splitting the light beam emitted from the light source into the signal beam and the reference beam;
   an optical axis split element for splitting the reference beam into two light beams in different propagation directions having polarized states substantially orthogonal to each other;
   an angular variable element for changing an incident angle of the reference beam split into the two light beams which irradiates the optical information recording medium;
   a spatial light modulator for adding the information signal to the signal beam;
   an objective lens for irradiating the optical information recording medium with the signal beam to which the information signal is added;

an image sensor for detecting a diffracted beam generated from a recorded region when irradiating the optical information recording medium with the reference beam split into the two light beams; and a photodetector for detecting the diffracted beam generated from the recorded region when irradiating the optical information recording medium with the reference beam split into the two light beams, wherein an angular error signal is generated for controlling the angular variable element using the signal detected by the photodetector.

2. An optical information recording and reproducing device that records an information signal by forming a hologram on an optical information recording medium, or reproduces the information signal from the hologram on the optical information recording medium, comprising:

the holographic optical pickup device according to claim 1;

a signal generation circuit that transmits the information signal to be recorded to the spatial light modulator in the holographic optical pickup device;

a signal processing circuit that reproduces the information signal using a signal detected by the image sensor in the holographic optical pickup device;

a servo signal generation circuit that generates an angular error signal of an incident angle of the reference beam using a signal detected by the photodetector in the holographic optical pickup device; and a servo control circuit that controls the angular variable element in accordance with the angular error signal.

3. A holographic optical pickup device for recording an information signal by irradiating an optical information recording medium with a reference beam and a signal beam to form a hologram, or reproducing the information signal by irradiating the hologram on the optical information recording medium with the reference beam, comprising:

a light source for emitting a light beam;

a split element for splitting the light beam emitted from the light source into the signal beam and the reference beam;

an optical axis split element for splitting the reference beam into two light beams in different propagation directions having polarized states substantially orthogonal to each other;

a first angular variable element for changing an incident angle of the reference beam split into the two light beams for irradiating the optical information recording medium;

a spatial light modulator for adding the information signal to the signal beam;

an objective lens for irradiating the optical information recording medium with the signal beam to which the information signal is added;

a second angular variable element for reflecting the reference beam that has transmitted through the optical information recording medium, and irradiating the optical information recording medium with a conjugate beam conjugated with the reference beam by changing the incident angle;

an image sensor for detecting a diffracted beam generated from a recorded region to form a reproduction signal when irradiating the optical information recording medium with the conjugate beam from the second angular variable element; and a photodetector for detecting the diffracted beam generated from the recorded region when irradiating the optical information recording medium with the reference beam or the conjugate beam, wherein an angular error signal is generated for controlling the first angular variable element using a signal detected by the photodetector.

4. The holographic optical pickup device according to claim 3, wherein the photodetector includes a first photodetector for detecting a predetermined polarized light component of the diffracted beam generated from the recorded region in the optical information recording medium when irradiating the optical information recording medium with the reference beam from the first angular variable element, and a second photodetector for detecting a predetermined polarized light component of the diffracted beam generated from the recorded region in the optical information recording medium when irradiating the optical information recording medium with the conjugate beam from the second angular element light; and an angular error signal is generated for controlling the first angular variable element by calculating a differential value between a first signal derived from the first photodetector and a second signal derived from the second photodetector.

5. The holographic optical pickup device according to claim 4, further comprising a third photodetector for detecting the conjugate beam reflected by the second angular variable element, wherein a light receiver of the third photodetector is divided into at least two sections; and an angular error signal is generated for controlling the second angular variable element from at least two signals derived from the light receiver of the third photodetector.

6. The holographic optical pickup device according to claim 3, wherein the conjugate beam for generating the diffracted beam formed as the reproduction signal from the recorded region in the optical information recording medium is substantially vertically incident on and reflected by the second angular variable element.

7. The holographic optical pickup device according to claim 3, wherein when setting an incident angle range A of the reference beam where a signal of the diffracted beam is obtained from the recorded region by irradiating the optical information recording medium with the reference beam, a relative angle $\phi$ in a propagation direction between two beams split by the optical axis split element is set to be equal to or smaller than A/2.

8. A holographic optical pickup device for recording an information signal by irradiating an optical information recording medium with a reference beam and a signal beam to form a hologram, or reproducing the information signal by irradiating the hologram on the optical information recording medium with the reference beam, comprising:

a light source for emitting a light beam;

a split element for splitting the light beam emitted from the light source into the signal beam and the reference beam;

an optical axis split element for splitting the reference beam into two light beams in different propagation directions having polarized states substantially orthogonal to each other;

a first angular variable element for changing an incident angle of the reference beam split into the two light beams for irradiating the optical information recording medium;

a spatial light modulator for adding the information signal to the signal beam;

an objective lens for irradiating the optical information recording medium with the signal beam to which the information signal is added;

a second angular variable element for reflecting the reference beam that has transmitted through the optical information recording medium, and irradiating the optical information recording medium with a conjugate beam conjugated with the reference beam by changing the incident angle;

an image sensor for detecting a diffracted beam generated from a recorded region to form a reproduction signal when irradiating the optical information recording medium with the conjugate beam from the second angular variable element;

a first photodetector for detecting a first polarized light component of the diffracted beam generated from the recorded region in the optical information recording medium when irradiating the optical information recording medium with the reference beam from the first angular variable element; and a second photodetector for detecting a second polarized light component of the diffracted beam generated from the recorded region in the optical information recording medium when irradiating the optical information recording medium with the reference beam from the first angular variable element, wherein the first polarized light component and the second polarized light component of the diffracted beam detected by the first and the second photodetectors are substantially orthogonal to each other; and an angular error signal for controlling the first angular variable element is generated using signals detected by the first and the second photodetectors.

9. The holographic optical pickup device according to claim 8, wherein when setting a relative angle φ between the two beams split in a propagation direction by the optical axis split element, the conjugate beam that generates the diffracted beam formed as the reproduction signal from the recorded region in the optical information recording medium is incident or reflected while being shifted by an angle ±φ/4 from a direction vertical to the second angular variable element.

10. The holographic optical pickup device according to claim 8, wherein when setting an incident angle range A of the reference beam where a signal of the diffracted beam is obtained from the recorded region by irradiating the optical information recording medium with the reference beam, a relative angle φ in a propagation direction between two beams split by the optical axis split element is set to be equal to or smaller than A/2.

11. A holographic optical pickup device for recording an information signal by irradiating an optical information recording medium with a reference beam and a signal beam to form a hologram, or reproducing the information signal by irradiating the hologram on the optical information recording medium with the reference beam, comprising:

a light source for emitting a light beam;

a split element for splitting the light beam emitted from the light source into the signal beam and the reference beam;

an optical axis split element for splitting the reference beam into two light beams in different propagation directions having polarized states substantially orthogonal to each other;

a first angular variable element for changing an incident angle of the reference beam for irradiating the optical information recording medium;

a spatial light modulator for adding the information signal to the signal beam;

an objective lens for irradiating the optical information recording medium with the signal beam to which the information signal is added;

a second angular variable element for reflecting the reference beam that has transmitted through the optical information recording medium, and irradiating the optical information recording medium with a conjugate beam conjugated with the reference beam by changing the incident angle;

an image sensor for detecting a diffracted beam generated from a recorded region to form a reproduction signal when irradiating the optical information recording medium with the reference beam or the conjugate beam;

a first photodetector for detecting the diffracted beam generated from the recorded region when irradiating the optical information recording medium with the reference beam split into the two light beams;

a second photodetector for detecting the conjugate beam which is reflected by the second angular variable element and has transmitted through the optical information recording medium; and a detection lens for irradiating the photodetector with a beam, wherein an angular error signal for controlling the first angular variable element is generated based on a signal derived from the first photodetector, and wherein an angular error signal for controlling the second angular variable element is generated based on a signal derived from the second photodetector.

12. A method of reproducing optical information for reproducing an information signal by irradiating a hologram on an optical information recording medium with a reference beam, comprising the steps of:

splitting the reference beam into two light beams in different propagation directions, having polarized states substantially orthogonal to each other;

detecting a first diffracted beam generated from a recorded region by allowing the split light beam to be incident on the optical information recording medium from a first direction;

detecting a second diffracted beam generated from the recorded region by allowing the split light beam to be incident on the optical information recording medium from a second direction that is different from the first direction;

generating an error signal of an incident angle of the reference beam which generates a reproduction signal from the recorded region using the first diffracted beam and the second diffracted beam; and controlling the incident angle of the reference beam with respect to the optical information recording medium based on the error signal.

13. The method of reproducing optical information according to claim 12, wherein when setting an incident angle range A of the reference beam where a signal of the diffracted beam is obtained from the recorded region by irradiating the optical information recording medium with the reference beam, a relative angle φ in a propagation direction between the two split beams is set to be equal to or smaller than A/2.

14. The method of reproducing optical information according to claim 12, wherein when setting an incident angle range A of the reference beam where a signal of the diffracted beam is obtained from the recorded region by irradiating the optical information recording medium with the reference beam, a relative angle φ in a propagation direction between the two split beams is set to be equal to or smaller than A.

15. An optical information device for reproducing information from an optical information recording medium, comprising:
- an optical system configured to generate a reference beam;
- an optical axis split element configured to split the reference beam into at least a first light beam and a second light beam in different propagation directions, the first light beam and the second light beam having different polarized states from each other;
- an angular variable element configured to change an incident angle of the first light beam and the second light beam which irradiate the optical information recording medium;
- an image sensor configured to detect a diffracted beam generated from a recorded region when irradiating the optical information recording medium with the first light beam or the second light beam; and
- a photodetector configured to detect a diffracted beam generated from a recorded region when irradiating the optical information recording medium with the first light beam and the second light beam;
- wherein an angular error signal is generated for controlling the angular variable element based on a signal derived from the photodetector.

16. The optical information device according to claim 15, wherein the optical system includes:
- a light source configured to emit a light beam; and
- a split element configured to split the light beam emitted from the light source into a signal beam and the reference beam, the optical information device further comprising:
- a spatial light modulator configured to add an information signal to the signal beam; and
- an objective lens configured to irradiate the optical information recording medium with the signal beam to which the information signal is added.

17. The optical information device according to claim 15, wherein the first light beam and the second light beam have polarized states substantially orthogonal to each other.

18. The optical information device according to claim 15, wherein the photodetector includes a first photodetector configured to detect the diffracted beam of the first light beam generated from the recorded region when irradiating the optical information recording medium with the first light beam, and a second photodetector configured to detect the diffracted beam of the second light beam generated from the recorded region when irradiating the optical information recording medium with the second light beam; and
the angular error signal is generated for controlling the angular variable element by calculating a differential value between a first signal derived from the first photodetector and a second signal derived from the second photodetector.

19. The optical information device according to claim 15, wherein when setting an incident angle range A of the reference beam where a signal of the diffracted beam is obtained from the recorded region by irradiating the optical information recording medium with the reference beam, a relative angle $\phi$ in a propagation direction between the first light beam and the second light beam is set to be equal to or smaller than $A/2$.

20. The optical information device according to claim 15, wherein when setting an incident angle range A of the reference beam where a signal of the diffracted beam is obtained from the recorded region by irradiating the optical information recording medium with the reference beam, a relative angle $\phi$ in a propagation direction between the first light beam and the second light beam is set to be equal to or smaller than A.

* * * * *